G. H. DODGE.
Steam Gage.
No. 35,871.
Patented July 15, 1862.
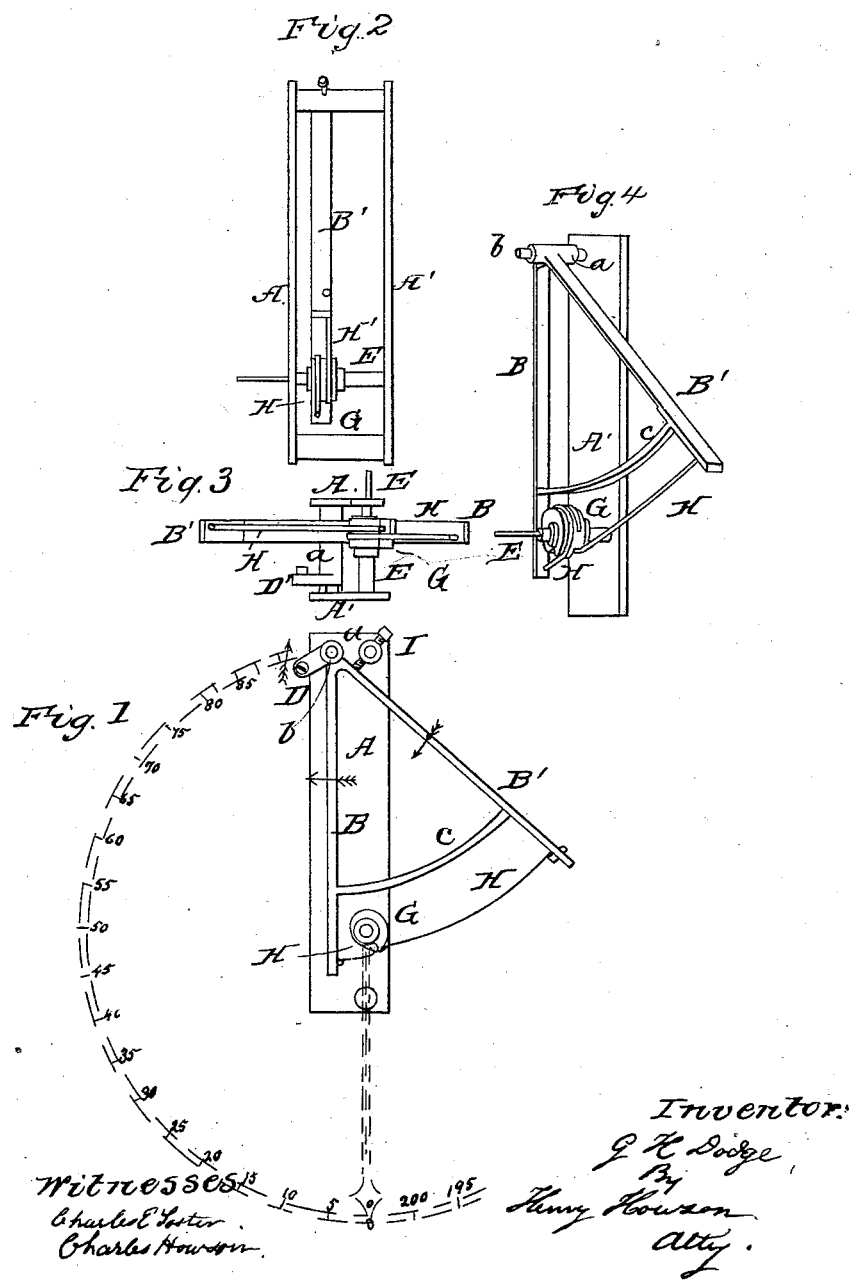

UNITED STATES PATENT OFFICE.

GEORGE H. DODGE, OF CAMDEN, NEW JERSEY.

IMPROVED STEAM-GAGE.

Specification forming part of Letters Patent No. 35,871, dated July 15, 1862.

*To all whom it may concern:*

Be it known that I, GEORGE H. DODGE, of Camden, Camden county, New Jersey, have invented certain Improvements in Steam-Gages; and I do hereby declare the following to be a full, clear, and exact description of the same, reference being had to the accompanying drawings, and to the letters of reference marked thereon.

My invention relates to improvements in steam-gages in which a main spring, acted upon by the pressure of steam, is caused to operate a pointer which traverses in close proximity to a graduated dial-plate.

My improvement consists, first, in two springs attached to two arms or their equivalents, which are acted on by the main spring, the said two springs being so constructed, applied to the spindle of the pointer, and operating substantially as described hereinafter, so as to serve both as a medium for transmitting the motion obtained by the compression of the main spring to the pointer, and as a means of moving the pointer in a contrary direction toward the zero-point of the dial-plate as the pressure is removed from the main spring, thereby enabling me to dispense with the usual independent spring, and also to supersede the imperfect system of cog-wheels or chains, which in ordinary steam-gages serve to transmit the motion of the main spring to the pointer.

My improvement consists, secondly, of a cam attached to the spindle of the pointer in combination with the aforesaid springs, and the arms or their equivalent, the whole being arranged and operating in the manner described hereinafter, so that the dial-plate may be graduated by simple measurement, instead of by the tedious process of ascertaining the proper points for marking the plate by a series of tests.

In order to enable others skilled in the art to make and use my invention, I will now proceed to describe its construction and operation.

On reference to the accompanying drawings, which form a part of this specification, Figure 1 is a front view of sufficient of a spring-gage to illustrate my improvements; Fig. 2, a side view of Fig. 1; Fig. 3, an inverted plan view of Fig. 2; and Fig. 4, a perspective view.

Similar letters refer to similar parts throughout the several views.

A represents a portion of the front or graduated dial-plate, and A' a portion of the rear plate, of a steam-gage, these two plates being connected together in a manner well known to those familiar with these instruments.

B and B' are two arms projecting from a hub, $a$, which is secured to a pin, $b$, the latter turning in the opposite plates, A and A', and the two arms being connected together by a bar, $c$. From the hub $a$ projects another arm, D, which is so connected with the main spring of the gage that the said spring tends to turn the arms B and B' in the direction pointed out by the arrows.

E is a spindle arranged to turn in the opposite plates, A and A', one end of this spindle projecting beyond the plate A, so as to receive the pointer, which traverses in close proximity to the graduated plate, and by means of which, in conjunction with the graduations on the plate, the pressure of steam which communicates with the instrument may be ascertained. To this spindle E is secured a cam, G, the form of which will be best observed on reference to Figs. 1 and 4, and to this cam are secured one end of the spring H and one end of the spring H', the opposite end of this spring H being attached to the arm B and the opposite end of the spring H' to the arm B'. These springs are made very thin and elastic, and are similar to the mainsprings of a watch, so that the spring H may be lapped round the edge of the cam and secured to that part of the latter which projects the shortest distance from the center of the spindle E, the spring H' being also lapped round the cam in a direction contrary to that of the spring H, and being secured to the edge of the cam near the point where the latter projects the greatest distance from the center of the spindle.

The springs are so constructed that the spring H has a tendency to assume the form of a coil, while the spring H' has a tendency to become straight; hence the latter spring, in its attempts to uncoil itself from the cam, tends to move the arms B and B' in a contrary direction to that pointed out by the arrows, while the spring H', in its attempts to coil itself round the cam, tends to move the arm in the same direction, both serving to maintain the arms in the position shown in Fig. 1, to which their movement is limited by the set-screw I. It will now be seen that while the main spring of the gage acting on the arm D tends to move the arms in the direction pointed out by the arrows, the two springs H and H' tend to move the arms in a contrary direction, that in the absence of any pressure of steam to act on the main spring the arms B and B' will be retained in the position shown in Fig. 1, and that the pointer attached to the spindle E will be directed to the zero-mark o on the graduated plate, as represented by dotted lines. The moment the pressure of steam, however, acts on the main spring, and the latter begins to overcome the resistance of the springs H and H', the arms B and B' will begin to move in the direction of the arrows, the cam, and consequently the pointer, moving in the same direction, the position of the pointer being determined by the pressure of steam acting on the main spring.

In most steam-gages heretofore constructed the graduations on the dial-plate are situated at unequal distances apart from each other. Thus the graduations which indicate a variation of pressure of from five to ten pounds of steam are a greater distance apart from each other than the graduations which indicate a pressure of from fifty to fifty-five pounds, because the rigidity of the main spring increases as the pressure of steam increases; hence it is a tedious matter to mark the graduations on the dial-plate, as each graduation must be ascertained by a separate test.

One of the main objects of my invention has been to obtain a uniform system of graduations, all being at equal distances apart from each other, and no more than two or three tests being required to ascertain the proper position of the required marks on the dial-plate. This end is accomplished by using the cam G instead of an ordinary pulley.

It will be observed that when the arms B and B' are in the position shown in Fig. 1 (the pointer being at zero) the springs H and H' are acting upon that portion of the cam which is farthest in distance from the center of the cam's rotation, and consequently the springs, in their tendency to maintain the pointer at zero, are acting on that pointer through the greatest leverage; but as the arms B and B' are moved in the direction of the arrow by the main spring of the instrument, the springs H and H' tending to move the arms and pointer in a contrary direction, these springs are acting on a part of the cam which is a less distance from its center of rotation, and consequently the springs are acting on the pointer through a lesser leverage.

It has been before remarked that the main spring will move a greater distance in indicating a variation of pressure of from five to ten pounds pressure of steam than it will in indicating a variation of pressure of from fifty to fifty-five pounds of steam; hence the marks five and ten on the dial-plate must in ordinary steam-gages be a greater distance apart from each other than the lines marked fifty and fifty-five. As motion is imparted from the main spring to the pointer through the springs H and H' and cam G, and as the force transmitted from the main spring to the pointer in the direction of the arrows must, on account of this cam, be through a constantly-diminishing leverage, the pointer having consequently a corresponding increase of speed, the difference between the marks five and ten would be actually less than the distance between the marks fifty and fifty-five if the movement of the main spring were equal throughout. As this is not the case, however, it becomes necessary to so form and proportion the cam G that as the main spring is being compressed and moves the pointer in the direction of the arrow the leverage acting on the cam will diminish and the pointer will move at an increasing speed proportionate to the diminishing speed of the main spring, owing to the increasing rigidity of the latter. It will be seen, therefore, that by properly forming the cam the whole of the graduated marks on the dial-plate may be at equal distances apart from each other, that after ascertaining by actual test two or three of the points which have to be marked the remaining points can be ascertained by simple measurement, and that the usual tedious process of graduating the dial-plate is avoided.

The springs H and H' perform two duties. First, they serve as a medium for transmitting motion to the pointer, and, secondly, they serve to return the pointer to the zero-point o as the pressure on the main spring decreases.

In steam-gages as heretofore constructed it has been usual to employ cog-wheels or chains as a medium of transmitting motion to the pointer from the main spring, and to use an independent spring for moving the pointer toward the zero-point.

Cog-wheels and chains are soon so worn and disarranged, especially when the gage is used on locomotive-engines, that the pointer is irregular in its movements and the instrument becomes defective and useless.

It will be evident that no agitation of the instrument can wear or disarrange the springs H and H', their action on the cam being so smooth and uniform that no sudden and irregular movements of the pointer can take place.

I claim as my invention and desire to secure by Letters Patent—

1. The two springs H and H', attached to the arms B and B' or their equivalents, and constructed, applied to the spindle of the pointer, and operating substantially as hereinbefore described.

2. The cam G on the spindle of the pointer, in combination with the springs H and H', and the arms B and B' or their equivalents, the whole being arranged and operating as and for the purpose herein set forth.

In testimony whereof I have signed my name to this specification in the presence of two subscribing witnesses.

GEORGE H. DODGE.

Witnesses:
HENRY HOWSON,
JOHN WHITE.